(12) United States Patent
Nakayama et al.

(10) Patent No.: US 7,134,304 B2
(45) Date of Patent: Nov. 14, 2006

(54) MICRO-ROLL FORMING DEVICE

(75) Inventors: Tatsuomi Nakayama, Kanagawa (JP); Minoru Ota, Kanagawa (JP); Manabu Wakuda, Kanagawa (JP); Kazuhiko Takashima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/982,869

(22) Filed: Nov. 8, 2004

(65) Prior Publication Data

US 2005/0103075 A1    May 19, 2005

(30) Foreign Application Priority Data

Nov. 19, 2003   (JP)   ............................. 2003-388957
Apr. 20, 2004   (JP)   ............................. 2004-124178

(51) Int. Cl.
*B21B 27/00*   (2006.01)

(52) U.S. Cl. ............................. 72/102; 72/14.4; 72/84; 72/703

(58) Field of Classification Search ................. 72/10.4, 72/13.4, 14.4, 14.5, 21.4, 21.5, 82, 83, 84, 72/85, 102, 107, 110, 703; 29/90.01
See application file for complete search history.

(56) References Cited

U.S. PATENT DOCUMENTS

| | | | | |
|---|---|---|---|---|
| 2,945,406 A | * | 7/1960 | Moore et al. | ................. 72/125 |
| 3,972,212 A | * | 8/1976 | Brinkman | .................... 72/102 |
| 4,118,846 A | * | 10/1978 | Korte | ........................ 29/90.01 |
| 4,893,514 A | * | 1/1990 | Gronert et al. | .......... 73/862.55 |
| 4,903,515 A | * | 2/1990 | Park | .............................. 72/85 |
| 5,099,558 A | * | 3/1992 | Wilson | ..................... 29/90.01 |
| 5,220,817 A | * | 6/1993 | Wenzel et al. | ................. 72/84 |
| 5,235,838 A | * | 8/1993 | Berstein | ..................... 148/510 |
| 5,863,239 A | * | 1/1999 | Barton, II | ..................... 451/65 |
| 6,154,941 A | * | 12/2000 | Cadena et al. | ............. 29/90.01 |

FOREIGN PATENT DOCUMENTS

JP    2000-227119 A    8/2000

* cited by examiner

*Primary Examiner*—Ed Tolan
(74) *Attorney, Agent, or Firm*—Foley & Lardner LLP

(57) ABSTRACT

A micro-roll forming device for providing a cylindrical blank metal article with a minute convexoconcave bearing surface, comprises a powered article holding structure that, when energized, rotates the cylindrical blank metal article about its axis; a forming tool that includes a form roller with a corrugated circular ridge; a tool holding structure that holds the forming tool in such a manner that the corrugated circular ridge of the form roller is directed toward and in contact with an outer surface of the cylindrical blank metal article rotatably held by the article holding structure; a biasing member that is incorporated with the tool holding structure to press the form roller against the outer surface of the cylindrical blank metal article with a given pressing force; and a powered moving structure that, when energized, moves at least one of the article holding structure and the tool holding structure in such a manner that the selected one moves in both a first direction perpendicular to an axis of the unselected one and a second direction parallel with the axis of the unselected one.

18 Claims, 7 Drawing Sheets

MICRO-ROLL FORMING DEVICE

BACKGROUND OF THE INVENTION

1. Field of the Invention

The present invention relates in general to micro-roll forming devices that form a minute convexoconcave bearing surface on a cylindrical metal article such as a camshaft, a piston or the like for providing the bearing portion of the article with a sufficiently low friction.

2. Description of the Related Art

In order to clarify the task of the present invention, one conventional device for providing a cylindrical metal article with a minute convexoconcave bearing surface will be briefly described with reference to FIGS. 10A and 10B of the accompanying drawings, which is shown in Japanese Laid-open Patent Application (Tokkai) 2000-227119.

As is seen from FIGS. 10A and 10B, the device is a shot peening device. In operation, a masking sheet 101 having a plurality of fine openings 101a is pasted on a cylindrical outer wall of a metal work piece "W", and then, with the work piece "W" being rotated, fine hard balls "P" of steel or ceramics are blown against masking sheet 101 together with a blast of air from an injection nozzle 102. With this, portions of the cylindrical outer wall of work piece "W" that are exposed to fine openings 101a are formed with a plurality of fine recesses, so that work piece "W" has a herringbone type grooved surface on the cylindrical outer wall thereof.

SUMMARY OF THE INVENTION

However, in the above-mentioned shot peening device, the work for pasting masking sheet 101 on work piece "W" and that for peeling masking sheet 101 from work piece "W" are troublesome and these manual works hinder improvement in productivity of the products. Furthermore, usage of masking sheets 101 increases a cost of the products because the sheets 101 are not inexpensive.

It is therefore an object of the present invention to provide a device, namely, a micro-roll forming device which is free of the above-mentioned drawbacks.

According to the present invention, there is provided a micro-roll forming device which can effectively and precisely form a minute convexoconcave bearing surface on a cylindrical blank metal article (or work piece).

In accordance with a first aspect of the present invention, there is provided a micro-roll forming device for providing a cylindrical blank metal article with a minute convexoconcave bearing surface. The device comprises a powered article holding structure that, when energized, rotates the cylindrical blank metal article about its axis; a forming tool that includes a form roller with a corrugated circular ridge; a tool holding structure that holds the forming tool in such a manner that the corrugated circular ridge of the form roller is directed toward and in contact with an outer surface of the cylindrical blank metal article rotatably held by the article holding structure; a biasing member that is incorporated with the tool holding structure to press the form roller against the outer surface of the cylindrical blank metal article with a given pressing force; and a powered moving structure that, when energized, moves at least one of the article holding structure and the tool holding structure in such a manner that the selected one moves in both a first direction perpendicular to an axis of the unselected one and a second direction parallel with the axis of the unselected one.

In accordance with a second aspect of the present invention, there is provided a micro-roll forming device for providing a cylindrical blank metal article with a minute convexoconcave bearing surface. The device comprises a powered article holding structure that, when energized, rotates the cylindrical blank metal article about its axis; a forming tool that includes a form roller with a corrugated circular ridge; a tool holding structure that holds the forming tool in such a manner that the corrugated circular ridge of the form roller is directed toward and in contact with an outer surface of the cylindrical blank metal article rotatably held by the article holding structure; a biasing member that is incorporated with the tool holding structure to press the form roller against the outer surface of the cylindrical blank metal article with a given pressing force; and a powered tool head that, when energized, moves the tool holding structure in both a first direction perpendicular to an axis of the cylindrical blank metal article held by the powered article holding structure and a second direction parallel with the axis of the cylindrical blank metal article held by the powered article holding structure.

BRIEF DESCRIPTION OF THE DRAWINGS

FIGS. 6A and 6B are views of a form roller that is employed in a micro-roll forming device of a second embodiment of the present invention, in which FIG. 6A is a sectional view of the form roller and FIG. 6B is a partial and enlarged view of a metal article, showing a recess formed on a bearing surface of the metal article by the form roller;

DETAILED DESCRIPTION OF THE EMBODIMENTS

In the following, various embodiments of the present invention will be described in detail with reference to the accompanying drawings.

For ease of understanding, the following description uses various directional terms, such as, right, left, upper, lower, rightward and the like. However, such terms are to be understood with respect to only drawing or drawings on which a corresponding member or portion is shown.

Figure 1:
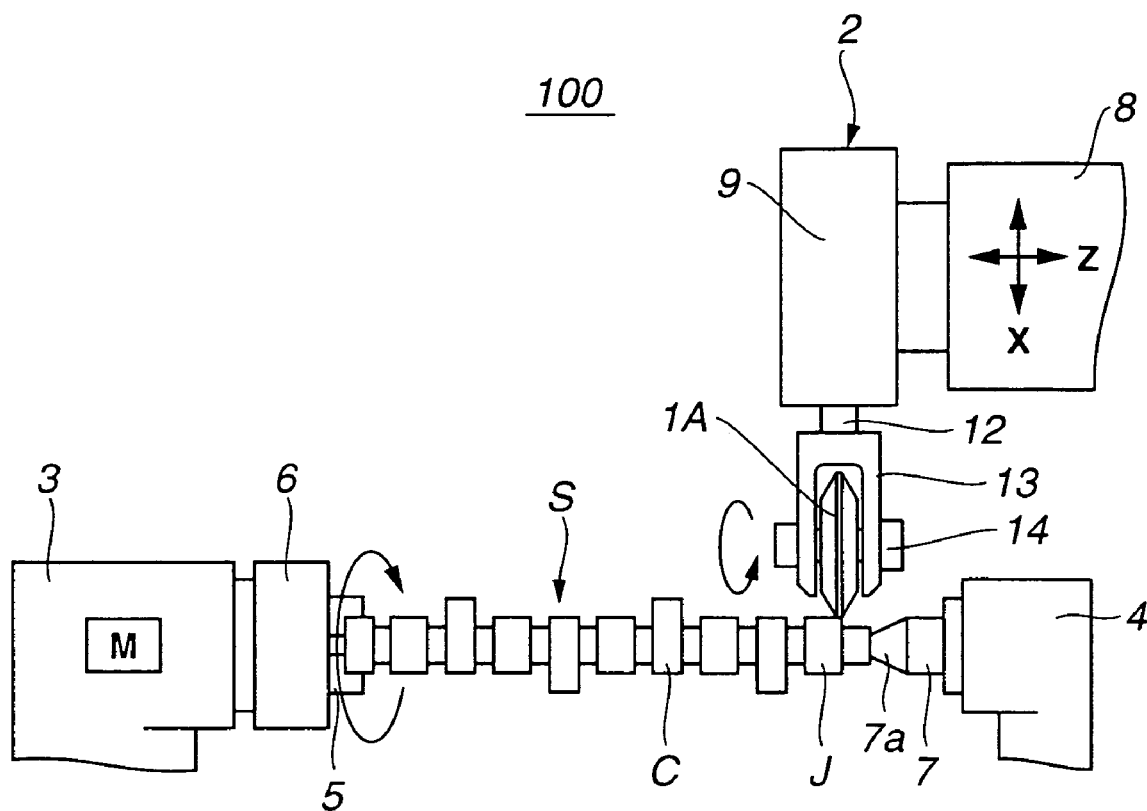
FIG. 1 is schematic view of a micro-roll forming device which is a first embodiment of the present invention.

Referring to FIG. 1 of the drawings, there is shown a micro-roll forming device 100 which is a first embodiment of the present invention. The device 100 shown is designed to finish an outer surface of each journal portion "J" of a camshaft "S" of an internal combustion engine. More specifically, the device 100 is constructed to provide each journal portion "J" with a minute convexoconcave bearing surface.

Figure 2:
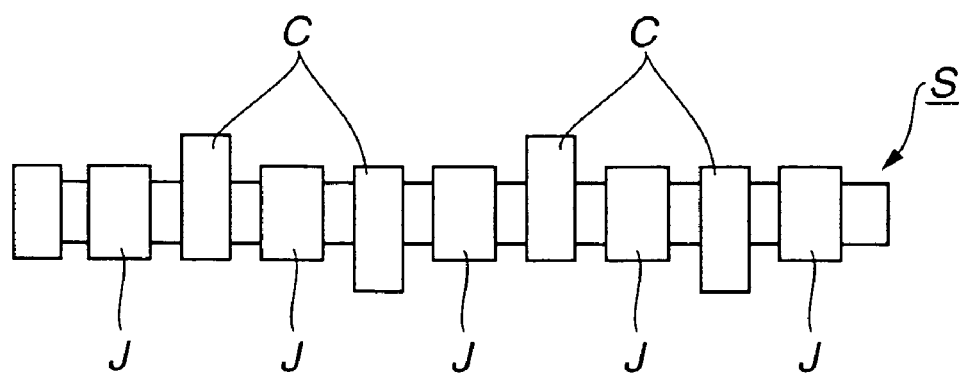
FIG. 2 is a view of a camshaft of an internal combustion engine that is to be finished by the micro-roll forming device of the first embodiment.

As is seen from FIG. 2, camshaft "S" illustrated has five journal portions "J" which are to be finished by the device 100. As shown, between adjacent journal portions "J", there is provided a cam "C". In the illustrated camshaft "S", there are provided four cams "C" in total.

Referring back to FIG. 1, micro-roll forming device 100 of the first embodiment generally comprises a powered shaft holding structure that holds axial ends of camshaft "S" in such a manner that camshaft "S" rotates about its axis, a forming tool 2 that includes a form roller 1A with a corrugated circular ridge (or minute convexoconcave pressing ridge) including alternately s arranged recesses 1a and projections 1b (see FIG. 4B), a tool holding structure that holds forming tool 2 in such a manner that the corrugated circular ridge of form roller 1A properly touches one of journal portions "J" of camshaft "S", and a biasing member that biases form roller 1A in such a manner that the corrugated circular ridge of form roller 1A is pressed against the journal portion "J" with a given pressing force. At least one of the powered shaft holding structure and the tool holding structure is arranged to move in both X-Z directions so that form roller 1A (or camshaft "S") is movable in X-direction perpendicular to the axis of camshaft "S" (or form roller 1A) and movable in Z-direction parallel with the axis of camshaft "S" (or form roller 1A).

In the illustrated first embodiment 100, the powered shaft holding structure comprises a fixed main stand 3 and a press stand 4 that is movable along a common axis of main and press stands 3 and 4.

Fixed main stand 3 has an electric motor "M" installed therein and a chuck device 6 rotatably connected thereto. When motor "M" is energized, chuck device 6 is rotated about its axis. Chuck device 6 is equipped with chucking paws 5. As shown, one end of camshaft "S" is grasped by chucking pawls 5 of chuck device 6.

Press stand 4 has a shaft 7 rotatably connected thereto. Shaft 7 has a conical head 7a that is engaged with the other end of camshaft "S". With this, camshaft "S" is rotatably supported by and between main stand 3 and press stand 4.

Tool holding structure shown is a powered tool head 8. As shown, powered tool head 8 holds and drives forming tool 2 in such a manner that form roller 1A moves in X-direction perpendicular to the axis of camshaft "S" and moves in Z-direction parallel with the axis of camshaft "S".

Figure 3:
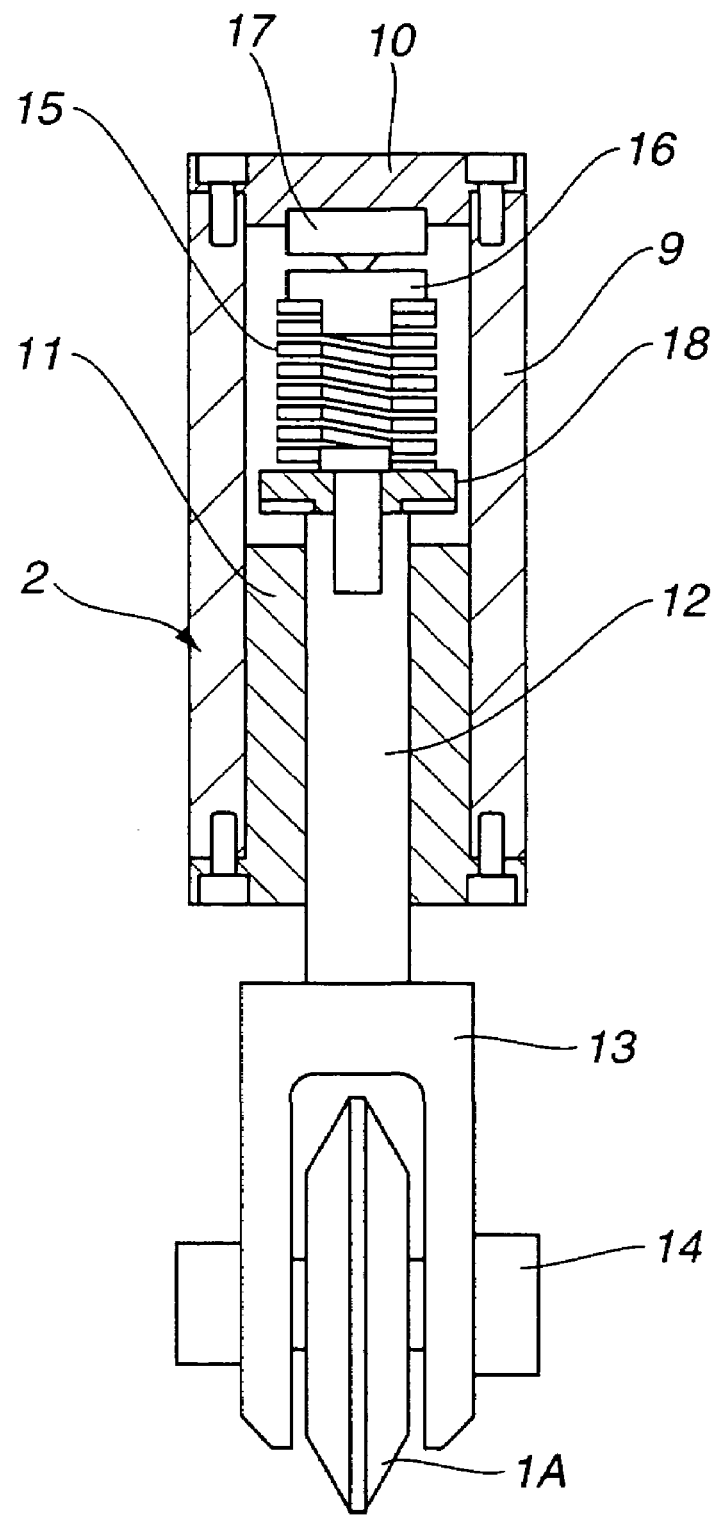
FIG. 3 is a sectional view of an essential portion of the micro-roll forming device of the first embodiment.

As is seen from FIG. 3, forming tool 2 comprises a cylindrical housing 9, a lid member 10 plugged in an upper open end of housing 9, a cylindrical holder 11 tightly received in housing 9, and a sliding rod 12 axially slidably received in cylindrical holder 11. A lower end of sliding rod 12 is equipped with a fork-shaped retainer 13 by which form roller 1A is rotatably held through a rotation shaft 14.

In cylindrical housing 9, there is arranged a spring seat 18 that is secured to an upper end of sliding rod 12. Between spring seat 18 and lid member 10, there is compressed a coil spring 15. Due to work of coil spring 15, form roller 1A is pressed against a given portion of camshaft "S" (see FIG. 1). As shown, an upper end of coil spring 15 is equipped with a pressure receiving member 16. Between this pressure receiving member 16 and lid member 10, there is installed a piezoelectric load cell 17 that detects a pressure load applied to form roller 1A by coil spring 15.

As will be understood from the above description, in this first embodiment 100, coil spring 15 that is a load applying means and load cell 17 that is a load detecting means are both compactly installed in forming tool 2, which brings about a compact construction micro-roll forming device 100. It is now to be noted that if desired, in place of coil spring 15, a hydraulic power device may be used for applying the pressing load to form roller 1A.

Micro-roll forming device 100 may be constructed by modifying a conventional machine tool that is controlled by a numerical control (NC). In this case, the machine tool should be of a type having respective structures which correspond to the above-mentioned main stand 3, press stand 4 and tool head 8. In this machine tool, information signal from load cell 17 is led into a control unit of the machine tool, so that an after-mentioned corrugating work by form roller 1A is carried out based on the information signal.

Form roller 1A may be made of hard tool material, hard metals, aluminum, ceramics of nitrogen silicon and the like.

Figure 4A:
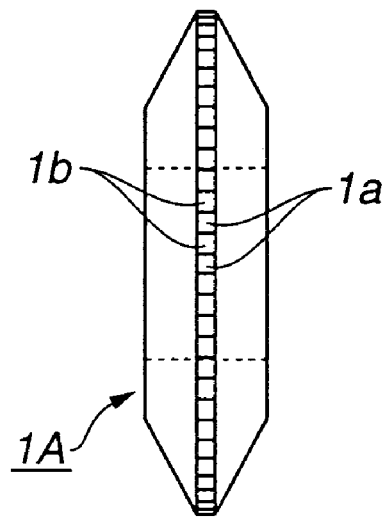
FIG. 4A and 4B are front and side views of a form roller employed in the micro-roll forming device of the first embodiment.
Figure 4B:
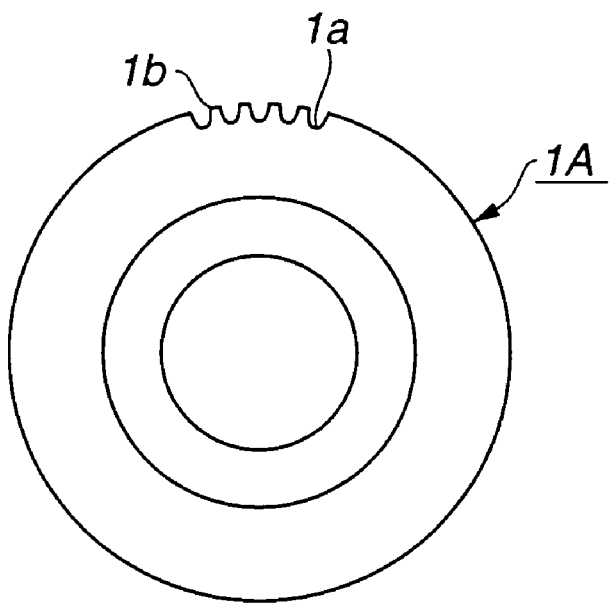

As is seen from FIGS. 4A and 4B, form roller 1A is formed with a corrugated circular ridge, which comprises alternately arranged recesses 1a and projections 1b. Preferably, each recess 1a (or each projection) has a depth (or height) of about 100 μm.

In the following, with the aid of the drawings, operation of micro-roll forming device 100 will be described in case where the device 100 finishes camshaft "S".

As is understood from FIG. 1, at first, camshaft "S" is properly set by and between main stand 3 and press stand 4. Then, by the work of powered tool head 8, form roller 1A is moved in the directions of "X" and "Z" and brought into contact with one of journal portions "J" of camshaft "S" having the corrugated circular ridge thereof placed at a rightmost edge of the selected journal portion "J". Then, by the continuous work of powered tool head 8, cylindrical housing 9 is pushed toward camshaft "S". With this, the corrugated circular ridge of form roller 1A is pressed against the rightmost edge of the selected journal portion "J" with a certain pressing force produced by the installed coil spring 15. Upon this, piezoelectric load cell 17 detects the pressing load applied to form roller 1A.

When, due to the further shifting of cylindrical housing 9 toward camshaft "S", the load detected by load cell 17 shows a predetermined value, the shifting of cylindrical housing 9 toward camshaft "S" is stopped, and then, electric motor "M" is energized to rotate camshaft "S" about its axis at a given speed. In the illustrated embodiment, the rotation speed of camshaft "S" is about 100 rpm. During rotation of camshaft "S", due to work of powered tool head 8, form roller 1A is moved axially from the rightmost edge of the journal portion "J" to a leftmost edge of the same while being pressed against the journal portion "J" with the predetermined pressing force. In the illustrated embodiment, the axially moving speed of form roller 1A is about 0.5 mm per each rotation of camshaft "S".

With this, the cylindrical outer wall of the journal portion "J" is entirely formed with a minute convexoconcave bearing surface. The rest of journal portions "J" of camshaft "S" is treated in substantially same manner as that described hereinabove. In the illustrated embodiment, the recesses of the minute convexoconcave bearing surface have a depth of about 1 μm.

As will be understood from the above description, under rotation of camshaft "S", form roller 1A is axially moved from the right edge of the journal portion "J" to the left edge of the same. Thus, actually, the minute convexoconcave bearing surface formed on each journal portion "J" is constituted by a long helical corrugated line that spirally runs about journal portion "J". However, if desired, the minute convexoconcave bearing surface may be constituted by a plurality of circular corrugated lines that concentrically run about journal portion "J". In this case, each time one circular corrugated line is formed on journal portion "J", form roller 1A has to be withdrawn from journal portion "J" and axially shifted by a given small distance. Considering the producing speed of the minute convexoconcave bearing surface, the way for producing the long helical corrugated line is more effective.

As is described hereinabove, the recesses of the minute convexoconcave bearing surface formed on each journal portion "J" of camshaft "S" have a depth of about 1 μm. However, as is easily understood, the depth can be varied by changing the pressing load applied to the form roller 1A.

As is seen from the foregoing description, according to the micro-roll forming device 100 of the first embodiment, journal portions "J" of camshaft "S" are easily and speedily finished even when the journal portions "J" require formation of a quite fine convexoconcave bearing surface thereon. That is, the device 100 brings about sufficient improvement in productivity and sufficient reduction in cost.

If an article to be finished by the device 100 has any portion, such as, oil opening, keyway and the like, that needs no finishing, avoiding the finishing on that portion is achieved by moving back form roller 1A from the article when form roller 1A is about to contact that portion.

Due to the nature of forming tool 2, the pressing load applied to form roller 1A can be kept constant even under rotation of camshaft "S". Thus, the recesses of the minute convexoconcave bearing surface formed on the walls of the journal portions "J" of camshaft "S" are prevented from having a large variation in depth, which brings about increase in quality of camshaft "S".

Furthermore, as is described hereinabove, the device 100 of the first embodiment is easily embodied by modifying a conventional machine tool. Usage of piezoelectric load cell 17 as a load detecting means simplifies a signal input system of the device 100.

In the device 100, the pressing force applied to form roller 1A is appropriately controlled based on the information signal issued from load cell 17. Accordingly, even if there is produced a dimensional displacement between camshaft "S" and powered tool head 8 due to a change in temperature or the like, precise finishing of the journal portions "J" is obtained.

Since formation of the minute convexoconcave bearing surface on journal portions "J" of camshaft "S" is made by the corrugated circular ridge of form roller 1A, only small pressing force is needed for pressing form roller 1A against journal portions "J". Accordingly, undesired deflection of camshaft "S" is suppressed or at least minimized, which simplifies the work for properly operating the device 100.

Figure 5A:
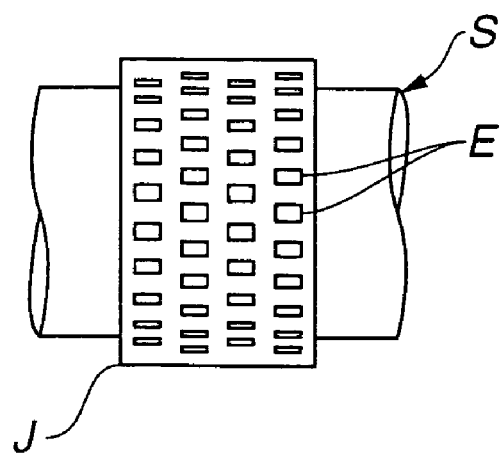
FIGS. 5A and 5B are front views of two metal articles that have been finished by the micro-roll forming device of the first embodiment.
Figure 5B:
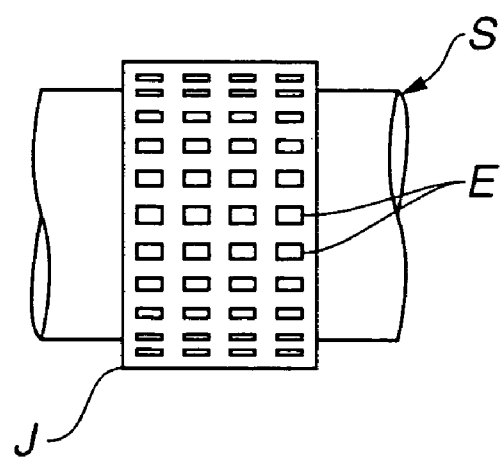

The shape of the minute convexoconcave bearing surface is easily changed by changing the axially moving speed of form roller 1A or changing form roller 1A. That is, as is seen from FIGS. 5A and 5B, the minute convexoconcave bearing surface may have a staggered form (FIG. 5A) or a properly arrayed form (FIG. 5B). For forming the staggered form of FIG. 5A, corrugated circular ridge of form roller 1A and journal portion "J" have a dimensional relation in diameter that induces a half-pitch displacement of a sequent helical corrugated line on journal portion "J" per each rotation of camshaft "S".

Figure 6A:
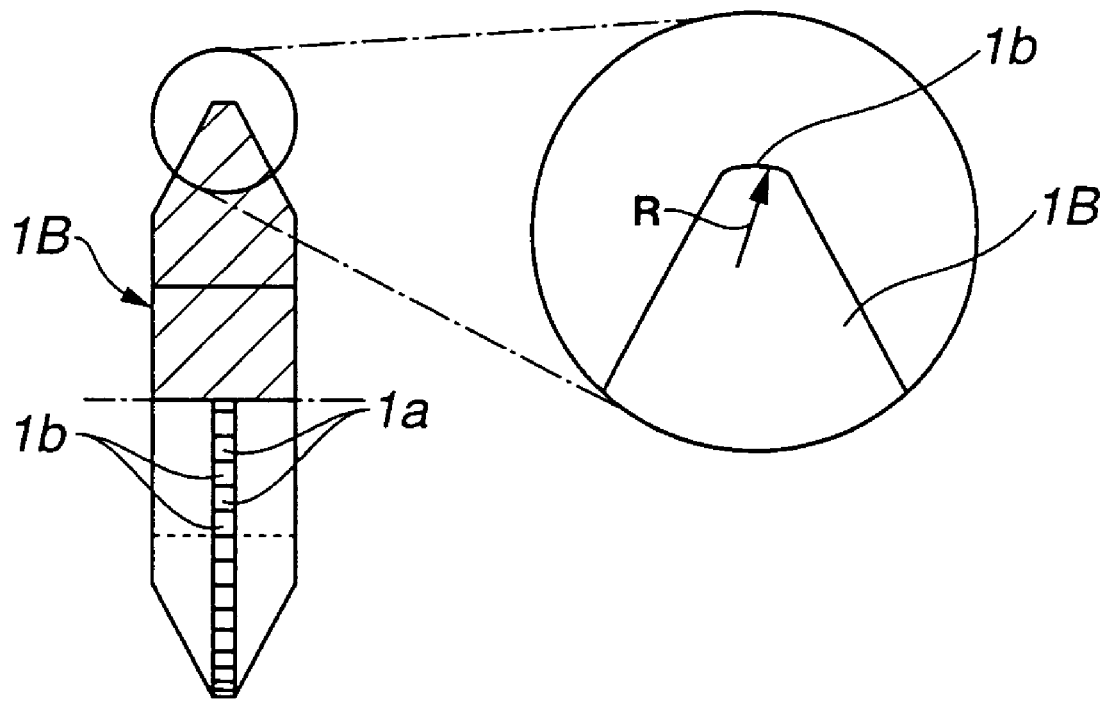
Figure 6B:
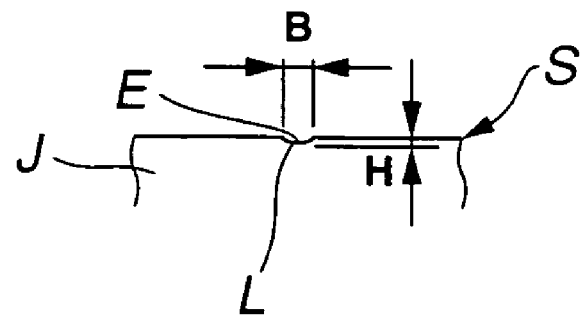

Referring to FIGS. 6A and 6B, there is shown a form roller 1B that is employed in a micro-roll forming device 200 of a second embodiment of the present invention.

In this second embodiment 200, parts and arrangement of the device 200 other than form roller 1B are substantially the same as those of the above-mentioned first embodiment 100.

As is seen from FIG. 6A, the corrugated circular ridge of this form roller 1B is convexly rounded. More specifically, as will be understood when referring to FIG. 4B, each of projections 1b of form roller 1B has a top that is convexly rounded. Due to provision of such rounded top, the pressing of the corrugated circular ridge of form roller 1B against journal portion "J" of camshaft "S" is much appropriately achieved. That is, even if the cylindrical outer surface of journal portion "J" has a poor cylindricity, a satisfied finishing to the journal portion "C" is achieved.

As is seen from FIG. 6B, when form roller 1B is actually applied to journal portion "J" of camshaft "S", there is produced a corrugated line "L" on the cylindrical surface of journal portion "J", that includes aligned recesses "E" each having a given width "B" and a given depth "H".

If a radius of curvature "R" of the rounded top of the corrugated circular ridge satisfies the following inequality, satisfied finishing of journal portion "J" of camshaft "S" is expected:

$$R \leq (H/2) \times \{1+(B/2)^2\} \tag{1}$$

If this inequality (1) is practically used, a desired corrugated line "L" including desired aligned recesses "E" can be formed on the cylindrical surface of journal portion "J" of camshaft "S".

If the width of the corrugated circular ridge of form roller 1B is increased, the width "B" of each recess "E" is increased which increases an oil holding capacity of camshaft "S" during operation of an associated internal combustion engine.

Figure 7:
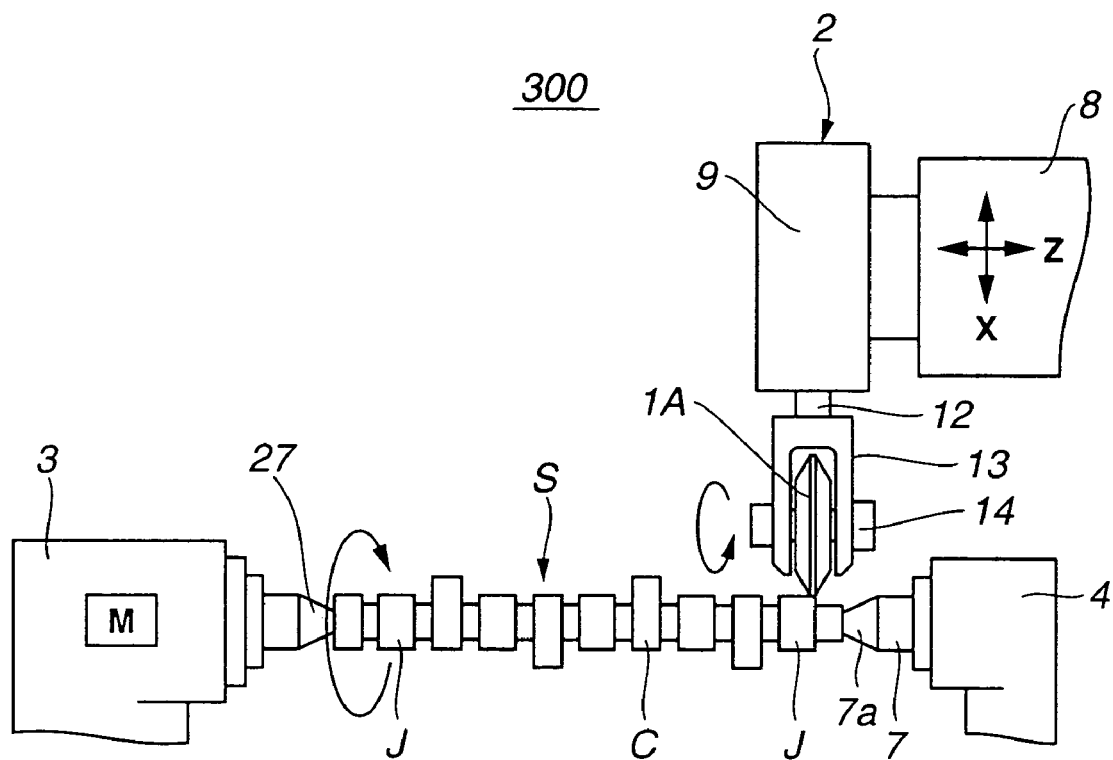
FIG. 7 is a view similar to FIG. 1, but showing a micro-roll forming device of a third embodiment of the present invention.
Figure 8:
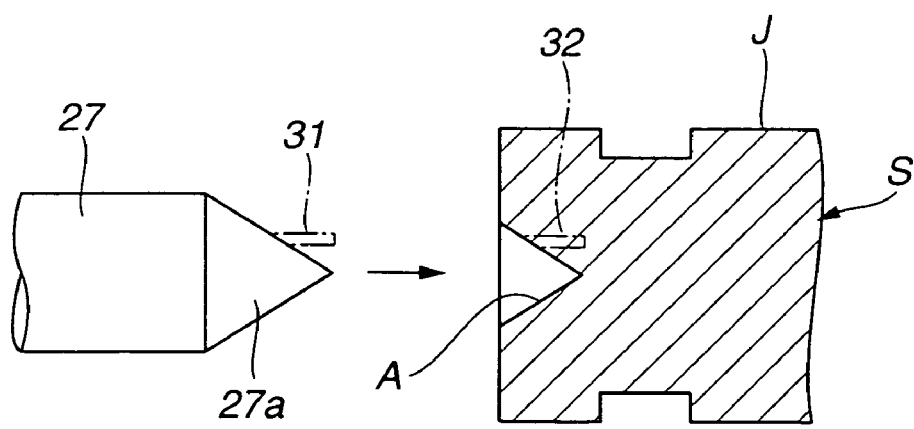
FIG. 8 is a partial and enlarged view of an essential portion of the third embodiment, showing a holder shaft and a bore.

Referring to FIGS. 7 and 8, particularly FIG. 7, there is shown a micro-roll forming device 300 which is a third embodiment of the present invention.

As is seen from FIG. 8, in this third embodiment 300, a holder shaft 27 is used in place of the chuck device 6 employed in the above-mentioned first embodiment 100 (see FIG. 1).

For holding the left end of camshaft "S", holder shaft 27 is rotatably held by main stand 3 and driven by the electric motor "M". Holder shaft 27 has a conical head 27a that can be intimately engaged with a conical center recess "A" formed in the left end of camshaft "S". Thus, when camshaft "S" is properly set between holder shaft 27 of main stand 3 and rotatable shaft 7 of press stand 4, camshaft "S" can be rotated about its axis by the electric motor "M".

Tests have revealed that rotation of camshaft "S" is hardly obstructed even when form roller 1A is applied to journal portion "J" of camshaft "S".

However, if desired, as is shown by broken lines in FIG. 8, conical head 27a of holder shaft 27 may have a stopper pin 31 fixed thereto. In this case, conical center recess "A" has a bore 32 for receiving stopper pin 31 upon engagement between conical head 27a and center recess "A". With this, the driving force of the motor "M" is much assuredly transmitted to camshaft "S". Of course, these pin 31 and bore 32 may be provided by camshaft "S" and conical head 27a.

In this third embodiment 300, due to the simple and compact shape of holder shaft 27, the axial movement of form roller 1A at the time when the same is finishing the leftmost journal portion "J" of camshaft "S" is easily made without worrying about interference by holder shaft 27.

Furthermore, in the modification of FIG. 8, rotation of camshaft "S" is much reliably achieved.

Figure 9:
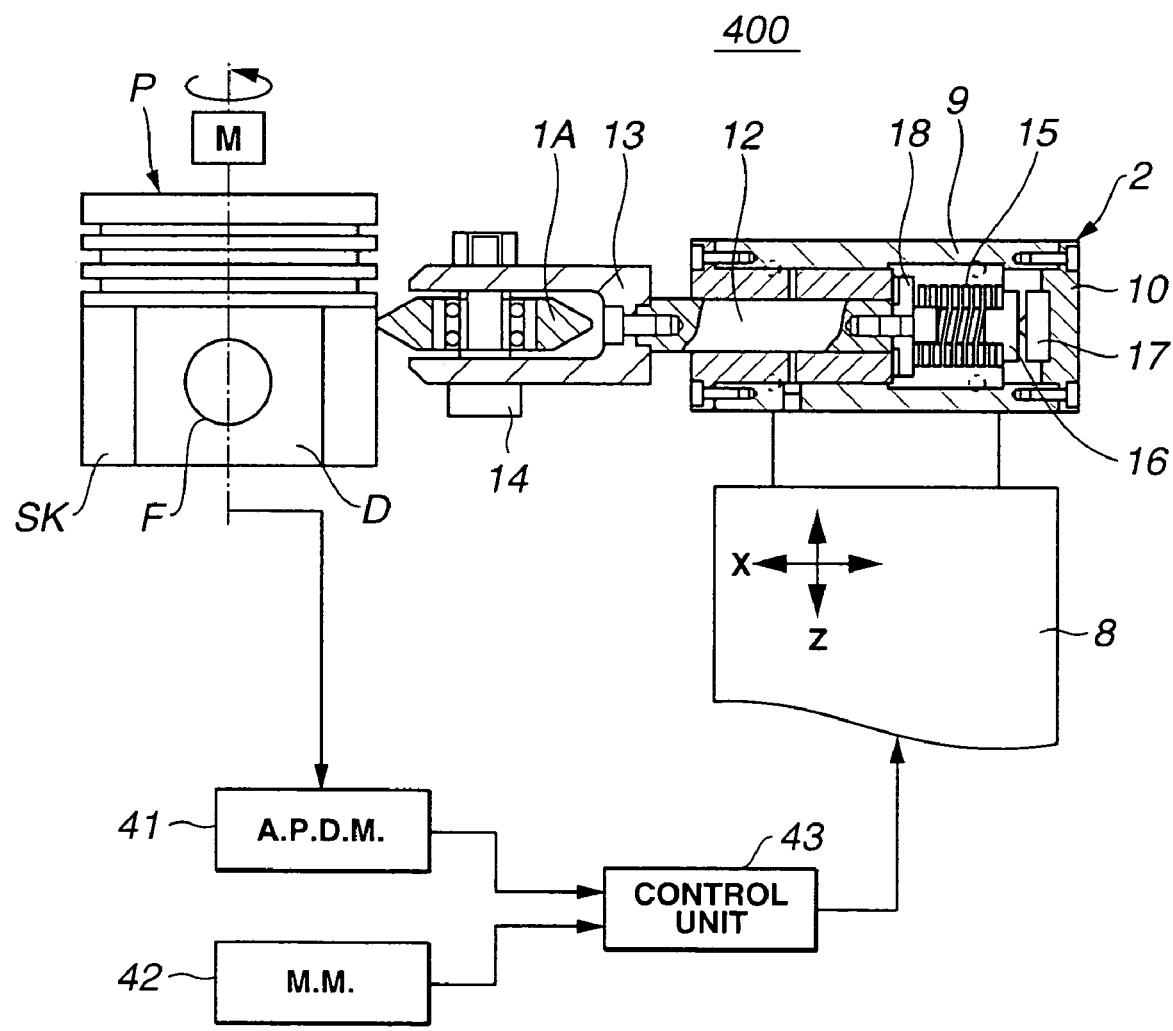
FIG. 9 is a sectional view of a micro-roll forming device which is a fourth embodiment of the present invention.
Figure 10A:
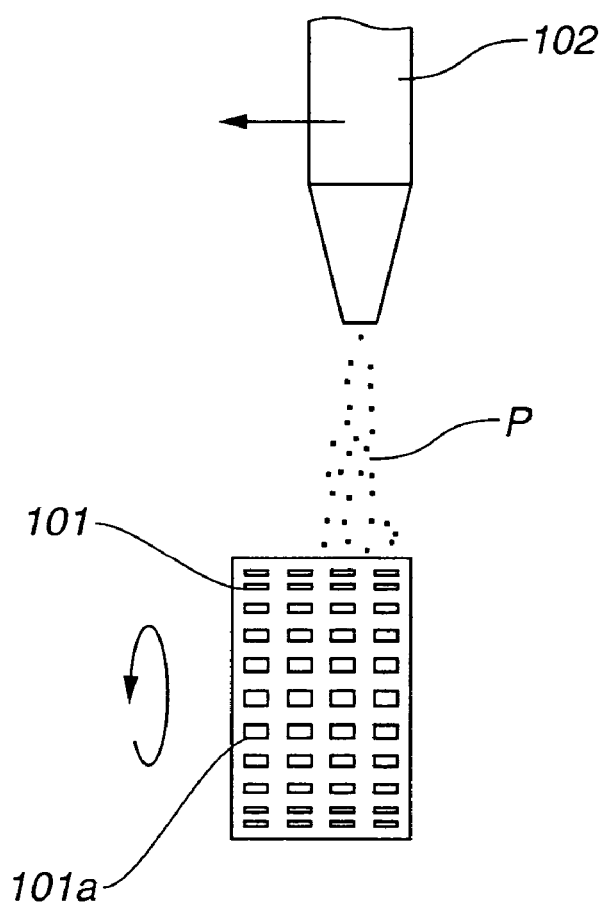
FIGS. 10A and 10B are schematic illustrations for explaining a conventional shot peening device.
Figure 10B:
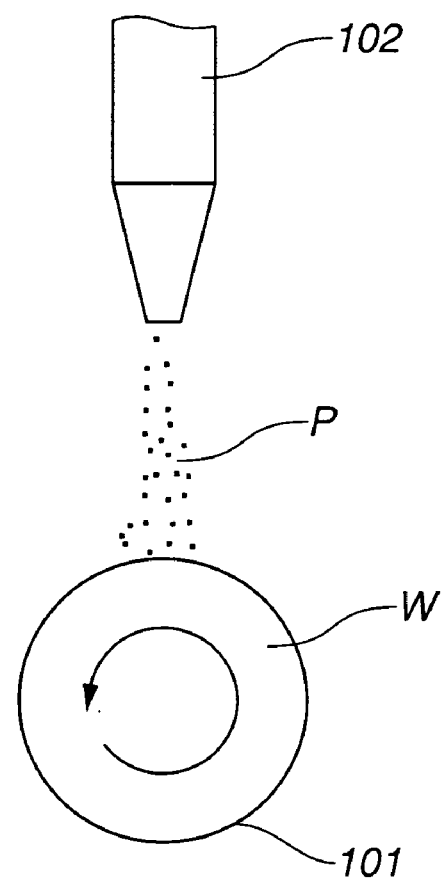

Referring to FIG. 9, there is shown a micro-roll forming device 400 which is a fourth embodiment of the present invention.

The device 400 of this embodiment is constructed to finish a piston "P" of an internal combustion engine. That is, the device 400 is constructed to finish a skirt portion "Sk" of piston "P".

Since major parts of this fourth embodiment 400 are substantially the same as those of the above-mentioned first embodiment 100, explanation of such major parts will be omitted from the following description.

The piston "P" shown has a slightly elliptic cross section. Skirt portion "Sk" of piston "P" is formed at diametrically opposed portions with aligned piston pin bores "F". Stepped areas "D" are provided on the surface of piston "P" at portions that respectively surround pin bores "F".

Although now shown in the drawing, piston "P" is rotatably held by a holding device that is basically same as that shown in FIG. 1. That is, piston "P" is rotated about its axis when the electric motor "M" is energized.

As shown, in this fourth embodiment 400, there are further employed an angular position detecting means 41 that detects an angular position of piston "P" that is under rotation, a memory means 42 that memorizes data that represent the position of the stepped areas "D" and a control unit 43 that controls tool head 8 in accordance with information signals from angular position detecting means 41 and memory means 42. Angular position detecting means 41 may be of a type that detects a phase of the rotating piston "P".

Like in the above-mentioned first, second and third embodiments 100, 200 and 300, under operation of the device 400 of this fourth embodiment, the corrugated circular ridge of form roller 1A is pressed against an outer surface of skirt portion "Sk" of piston "P" and moved axially. During this movement, the pressing force applied to form roller 1A is continuously controlled like in the above-mentioned embodiments. Accordingly, even though piton "P" has such an elliptic shape in cross section, precise finishing of the skirt portion "Sk" is possible.

In case of the illustrated piston "P", there is no need of finishing the stepped areas "D". Thus, the finishing operation of the device 400 to piton "P" is carried out with the aid of control unit 43. That is, when, under operation of the device 400, the axially moving form roller 1A comes to a start position of the stepped areas "D", form roller 1A is shifted back from the rotating piston "P" by the work of tool head 8 and when the axially moving form roller 1A comes to an end position of the stepped areas "D", form roller 1A is shifted forward to operatively contact the outer surface of skirt portion "Sk". With this, the outer surface of skirt portion "Sk" other than the stepped areas "D" is appropriately finished by the device 400.

In the above-mentioned embodiments 100, 200, 300 and 400, form rollers 1A and 1B are of a single ridge type. However, if desired, a form roller having two or more corrugated circular ridges may be used in the present invention. Furthermore, if desired, in place of tool head 8, main stand 3 and press stand 4 may be so arranged that camshaft "S" or piston "P" held by them can move in the directions of "X" and "Z".

The entire contents of Japanese Patent Applications 2003-388957 filed Nov. 19, 2003 and 2004-124178 filed Apr. 20, 2004 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A micro-roll forming device for providing a cylindrical blank metal article with a minute convexoconcave bearing surface, comprising:
    a powered article holding structure that, when energized, rotates the cylindrical blank metal article about its axis;
    a forming tool that includes a form roller with a corrugated circular ridge;
    a tool holding structure that holds the forming tool in such a manner that the corrugated circular ridge of the form roller is directed toward and in contact with an outer surface of the cylindrical blank metal article rotatably held by the article holding structure;
    a biasing member that is incorporated with the tool holding structure to press the form roller against the outer surface of the cylindrical blank metal article with a given pressing force;
    a powered tool head that, when energized, moves the tool holding structure in both a first direction perpendicular to the axis of the cylindrical blank metal article and a second direction parallel with the axis of the cylindrical blank metal article;
    a control unit that controls the powered tool head in such a manner that the form roller of the forming tool moves in the second direction while contacting the outer surface of the cylindrical blank metal article at the corrugated circular ridge thereof with a given pressing force; and
    a pressure load detecting device that detects a pressure load applied to the form roller by the biasing member and feeds a corresponding information signal to the control unit to control the given pressing force.

2. A micro-roll forming device as claimed in claim 1, in which the control unit is configured to carry out:
    processing the corresponding information signal from the pressure load detecting device to derive the pressure load applied to the form roller; and
    energizing both the powered article holding structure and the powered tool head when the pressure load detected indicates a predetermined value.

3. A micro-roll forming device as claimed in claim 1, in which the biasing member and the pressure load detecting device are installed in the forming tool, and in which the pressure load detecting device is a piezoelectric load cell arranged to detect a load applied to the form roller from the biasing member.

4. A micro-roll forming device as claimed in claim 1, in which the corrugated circular ridge of the form roller is a minute convexoconcave pressing ridge including alternately arranged recesses and projections.

5. A micro-roll forming device as claimed in claim 1, in which a top of the corrugated circular ridge of the form roller is convexly rounded.

6. A micro-roll forming device as claimed in claim 4, in which each of the projections of the minute convexoconcave pressing ridge of the form roller has a top that is convexly rounded.

7. A micro-roll forming device as claimed in claim 6, in which the convexly rounded top of the ridge of the form roller satisfies the following inequality:

$$R \leq (H/2) \times \{1+(B/2)^2\}$$

wherein:
R: radius of curvature of the convexly rounded top;
H: depth of a recess that is produced on the outer surface of the cylindrical blank metal article by the convexly rounded top; and
B: width of the recess produced on the outer surface of the cylindrical blank metal article by the convexly rounded top.

8. A micro-roll forming device as claimed in claim 4, in which the alternately arranged recesses and projections of the minute convexoconcave pressing ridge are arranged to have the same pitch and in which the corrugated circular ridge of the form roller and the cylindrical blank metal article have a dimensional relation in diameter that induces a half-pitch displacement of a sequent helical corrugated line produced on the cylindrical blank metal article per each rotation of the cylindrical blank metal article.

9. A micro-roll forming device as claimed in claim 4, in which a length of each projection of the corrugated circular ridge in an axial direction is greater than a length of the same in a circumferential direction.

10. A micro-roll forming device as claimed in claim 1, in which the powered article holding structure comprises:
a main stand having an electric motor installed therein, the main stand having a holder to hold one end of the cylindrical blank metal article, the holder being rotated when the motor is energized; and
a press stand having a rotatable shaft that holds the other end of the cylindrical blank metal article.

11. A micro-roll forming device as claimed in claim 10, in which the holder of the main stand comprises:
a holder shaft rotatably held by the main stand and driven by the electric motor, the holder shaft having a conical head; and
a conical center recess formed in one end of the cylindrical blank metal article, the conical center recess intimately receiving the conical head of the holder shaft for rotating the cylindrical blank metal article with the force of the electric motor.

12. A micro-roll forming device as claimed in claim 11, further comprising:
a stopper pin fixed to the conical head of the holder shaft; and
a bore formed in the conical center recess of the cylindrical blank metal article, the bore receiving the stopper pin upon engagement between the conical head and the conical center recess.

13. A micro-roll forming device as claimed in claim 1, in which the cylindrical blank metal article is a blank camshaft of an internal combustion engine, the blank camshaft having a plurality of journal portions that are to be finished by the form roller.

14. A micro-roll forming device as claimed in claim 1, in which the cylindrical blank metal article is a blank piston of an internal combustion engine, the blank piston including a skirt portion that is to be finished by the form roller and stepped areas that are formed on the surface of the blank piston.

15. A micro-roll forming device as claimed in claim 14, further comprising:
an angular position detector that detects an angular position of the blank piston that is under rotation;
a memory that memorizes data that represent the position of the stepped areas; and
a control unit that controls the powered tool head in accordance with information signals issued from the angular position detector and the memory.

16. A micro-roll forming device for providing a cylindrical blank metal article with a minute convexoconcave bearing surface, comprising:
a powered article holding structure that, when energized, rotates the cylindrical blank metal article about its axis;
a forming tool that includes a form roller with a corrugated circular ridge;
a tool holding structure that holds the forming tool in such a manner that the corrugated circular ridge of the form roller is directed toward and in contact with an outer surface of the cylindrical blank metal article rotatably held by the article holding structure;
a biasing member that is incorporated with the tool holding structure to press the form roller against the outer surface of the cylindrical blank metal article with a given pressing force;
a powered tool head that, when energized, moves the tool holding structure in both a first direction perpendicular to an axis of the cylindrical blank metal article held by the powered article holding structure and a second direction parallel with the axis of the cylindrical blank metal article held by the powered article holding structure;
a control unit that controls the powered tool head in such a manner that the form roller of the forming tool moves in the second direction while contacting the outer surface of the cylindrical blank metal article at the corrugated circular ridge thereof with a given pressing force; and
a pressure load detecting device that detects a pressure load applied to the form roller by the biasing member and feeds a corresponding information signal to the control unit to control the given pressing force.

17. A micro-roll forming device for providing a cylindrical blank metal article with a minute convexoconcave bearing surface, comprising:
a powered article holding structure that, when energized, rotates the cylindrical blank metal article about its axis;
a forming tool that includes a form roller with a corrugated circular ridge;
a tool holding structure that holds the forming tool in such a manner that the corrugated circular ridge of the form roller is directed toward and in contact with an outer surface of the cylindrical blank metal article rotatably held by the article holding structure;
a biasing member that is incorporated with the tool holding structure to press the form roller against the outer surface of the cylindrical blank metal article with a given pressing force; and
a powered tool head that, when energized, moves the tool holding structure in both a first direction perpendicular to the axis of the cylindrical blank metal article and a second direction parallel with the axis of the cylindrical blank metal article;
wherein the corrugated circular ridge of the form roller is a minute convexoconcave pressing ridge including alternately arranged recesses and projections;
wherein each of the projections of the minute convexoconcave pressing ridge of the form roller has a top that is convexly rounded;
wherein the convexly rounded top of the ridge of the form roller satisfies the following inequality:

$R \leq (H/2) \times \{1+(B/2)^2\}$ wherein:
R: radius of curvature of the convexly rounded top;
H: depth of a recess that is produced on the outer surface of the cylindrical blank metal article by the convexly rounded top; and
B: width of the recess produced on the outer surface of the cylindrical blank metal article by the convexly rounded top.

18. A micro-roll forming device for providing a cylindrical blank metal article with a minute convexoconcave bearing surface, comprising:
   a powered article holding structure that, when energized, rotates the cylindrical blank metal article about its axis;
   a forming tool that includes a form roller with a corrugated circular ridge;
   a tool holding structure that holds the forming tool in such a manner that the corrugated circular ridge of the form roller is directed toward and in contact with an outer surface of the cylindrical blank metal article rotatably held by the article holding structure;
   a biasing member that is incorporated with the tool holding structure to press the form roller against the outer surface of the cylindrical blank metal article with a given pressing force; and
   a powered tool head that, when energized, moves the tool holding structure in both a first direction perpendicular to the axis of the cylindrical blank metal article and a second direction parallel with the axis of the cylindrical blank metal article;
wherein the corrugated circular ridge of the form roller is a minute convexoconcave pressing ridge including alternately arranged recesses and projections;
wherein the alternately arranged recesses and projections of the minute convexoconcave pressing ridge are arranged to have the same pitch and in which the corrugated circular ridge of the form roller and the cylindrical blank metal article have a dimensional relation in diameter that induces a half-pitch displacement of a sequent helical corrugated line produced on the cylindrical blank metal article per each rotation of the cylindrical blank metal article.

* * * * *